United States Patent
Jan et al.

(10) Patent No.: US 9,683,098 B2
(45) Date of Patent: Jun. 20, 2017

(54) COLORED CONTACT LENSES

(71) Applicant: BenQ Materials Corporation, Taoyuan (TW)

(72) Inventors: Fan-Dan Jan, Taoyuan (TW); Mei-Yun Chang, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 0 days.

(21) Appl. No.: 14/979,587

(22) Filed: Dec. 28, 2015

(65) Prior Publication Data

US 2017/0066917 A1   Mar. 9, 2017

(30) Foreign Application Priority Data

Sep. 3, 2015 (TW) .............................. 104129162 A

(51) Int. Cl.
| | |
|---|---|
| *G02C 7/04* | (2006.01) |
| *C08L 33/14* | (2006.01) |
| *G02C 7/02* | (2006.01) |
| *C09D 133/14* | (2006.01) |
| *G02C 7/10* | (2006.01) |

(52) U.S. Cl.
CPC ............ *C08L 33/14* (2013.01); *C09D 133/14* (2013.01); *G02C 7/021* (2013.01); *G02C 7/04* (2013.01); *G02C 7/108* (2013.01); *C08L 2201/10* (2013.01); *G02C 2202/16* (2013.01)

(58) Field of Classification Search
CPC ... C08L 33/14; C08L 2201/10; C09D 133/14; G02C 7/04; G02C 7/021; G02C 2202/16
USPC .............................................. 351/159.24, 219
See application file for complete search history.

(56) References Cited

U.S. PATENT DOCUMENTS

| | | | |
|---|---|---|---|
| 2004/0180021 A1* | 9/2004 | De La Poterie ....... | A61K 8/731 424/70.12 |
| 2011/0025753 A1* | 2/2011 | Yanagi ................. | B41M 5/0011 347/21 |

FOREIGN PATENT DOCUMENTS

TW    I459071 B    11/2014

* cited by examiner

*Primary Examiner* — Tuyen Tra
(74) *Attorney, Agent, or Firm* — CKC & Partners Co., Ltd.

(57) ABSTRACT

The disclosure is related to colored contact lenses including a transparent protective layer, a colored layer and a lens layer, wherein the colored layer is between the transparent protective layer and the lens layer. A composition for forming the transparent protective layer includes at least one first hydrophilic monomer and a first thickener. A composition for forming the colored layer includes at least one second hydrophilic monomer, an adhesive resin, a second thickener and a colorant. At least one of the thickeners used for forming the transparent protective layer and the color layer is a modified polyvinylpyrrolidone.

10 Claims, No Drawings

COLORED CONTACT LENSES

CROSS-REFERENCE TO RELATED APPLICATION

This application claims the priority benefit of Taiwanese application serial no. 104129162, filed on Sep. 3, 2015, which is incorporated herein by reference.

BACKGROUND

Technical Field

The present disclosure relates to a colored contact lens. More particularly, the present disclosure relates to a colored contact lens with three-layered structure.

Description of Related Art

Nowadays, concerning fashion or clothes matching, consumers begin to wear colored contact lenses capable of altering their natural iris color. However these different colored or patterned contact lenses would fade or discolor so as to make the wearers have ocular allergy.

A conventional colored contact lens is manufactured by forming a colored layer on the contact lens surface. However, when the consumer's finger touches the colored layer side during the process of wearing or cleaning contact lenses, the colored layer would easily peel from the contact lens surface. Therefore, the colorant in the colored layer is likely to fall off and to adhere on the surface of the wearer's eye so that the ocular allergy or infection of the wearer would occur.

Therefore, a colored contact lens having an excellent colored performance is highly demanded.

SUMMARY

It is an object of the present disclosure to provide a novel colored contact lens including of a transparent protective layer, a colored layer and a lens layer, wherein the adhesion between the transparent protective layer and the colored layer is enhanced to prevent the colored layer from falling off to cause the fading or discoloration of the colored contact lenses.

The colored contact lens provided by the present disclosure includes a transparent protective layer which is produced by a polymerization of at least one first hydrophilic monomer and a first thickener; a colored layer which is produced by a polymerization of at least one second hydrophilic monomer, an adhesive resin, and a second thickener, and a colorant; and a lens layer which is formed by a hydrogel or a silicone hydrogel, wherein the colored layer is between the transparent protective layer and the lens layer and at least one of the first thickener and the second thickener agent is a modified polyvinylpyrrolidone which is produced by a polymerization of polymeric monomers and 2-isocyanatoethyl (meth)acrylate, wherein the polymeric monomer is selected from the group consisting of N-vinylpyrrolidone, 2-hydroxyethyl methacrylate and N-vinylacetamide.

In an embodiment of the present disclosure, the first hydrophilic monomer for forming the transparent protective layer of the colored contact lens and the second hydrophilic monomer for forming the colored layer thereof are respectively selected from the group consisting of N-vinylpyrrolidone (NVP), 2-hydroxyethyl methacrylate (HEMA), lauryl methacryate (LMA), N,N-dimethylacrylamide (DMA), methyl acrylic acid (MAA), N,N-diethylacrylamide, N-isopropylacrylamide, acrylic acid (AA), glycidyl methacrylate (GMA), (methyl)acrylamide, N,N-dimethylaminoethyl methacrylate (DMAEMA), vinyl acetate and N-acrylolmorpholine.

In an embodiment of the present disclosure, the first thickener in the transparent protective layer of the colored contact lens is a modified polyvinylpyrrolidone. The first thickener is present at an amount of 25 weight percent to 55 weight percent based on the total weight of the transparent layer.

In an embodiment of the present disclosure, the second thickener in the colored layer of the colored contact lens is a modified polyvinylpyrrolidone. The second thickener is present at an amount of 9 weight percent to 25 weight percent based on the total weight of the colored layer.

In an embodiment of the present disclosure, the first thickener in the transparent protective layer and the second thickener in the colored layer of the colored contact lens are both modified polyvinylpyrrolidone. The first thickener and the second thickener are present at an amount of 34 weight percent to 80 weight percent based on the total weight of the transparent protective layer and the colored layer.

In an embodiment of the present disclosure, the adhesive resin in the colored layer of the colored contact lens is selected from the group consisting of polyurethane, acrylic resin and phenolic resin.

In an embodiment of the present disclosure, the transparent protective layer and the colored layer of the colored contact lens further includes an initiator, a cross-linking agent, a defoaming agent, a dispersant, an anti-blue ray reagent, an UV blocking reagent or a combination thereof.

According the colored contact lens with three-layered structure of the present disclosure, the adhesion between the transparent protective layer and the colored layer is excellent to avoid fading or discoloration occurred to damage wearer's eyes.

In addition, the disclosure is also to provide a composition for forming colored contact lenses including at least one hydrophilic monomer and a thickener. The thickener used in the present invention is a modified polyvinylpyrrolidone which is produced by a polymerization of polymeric monomers and 2-isocyanatoethyl (meth)acrylate, wherein the polymeric monomer is selected from the group consisting of N-vinylpyrrolidone, 2-hydroxyethyl methacrylate and N-vinylacetamide.

In an embodiment of the present disclosure, the hydrophilic monomer in the composition for forming colored contact lenses are selected from the group consisting of N-vinylpyrrolidone (NVP), 2-hydroxyethyl methacrylate (HEMA), Lauryl methacryate (LMA), N,N-dimethylacrylamide (DMA), methyl acrylic acid (MAA), N,N-diethylacrylamide, N-isopropylacrylamide, acrylic acid (AA), glycidyl methacrylate (GMA), (methyl)acrylamide, N,N-dimethylaminoethyl methacrylate (DMAEMA), vinyl acetate and N-acrylolmorpholine.

In an embodiment of the present disclosure, the composition for forming colored contact lenses is used to form a transparent protective layer of the colored contact lens.

In an embodiment of the present disclosure, the composition for forming colored contact lenses further includes an adhesive resin and a colorant. In the embodiment of the present disclosure, the composition for forming colored contact lenses is used for forming a colored layer of the colored contact lens.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to an aspect of the present disclosure, the present disclosure provides a colored contact lens including a transparent protective layer which is produced by a polymerization of at least one first hydrophilic monomer and a first thickener; a colored layer which is produced by a polymerization of at least one second hydrophilic monomer, an adhesive resin and a second thickener, and a colorant; and a lens layer which is formed by a hydrogel or a silicone hydrogel. The colored layer of the present colored contact lenses is between the transparent protective layer and the lens layer and at least one of the first thickener and the second thickener is a modified polyvinylpyrrolidone which is produced by a polymerization of polymeric monomers and 2-isocyanatoethyl (meth)acrylate, wherein the polymeric monomer is selected from the group consisting of N-vinylpyrrolidone, 2-hydroxyethyl methacrylate and N-vinylacetamide.

For enhancing the adhesion between the transparent protective layer and the colored layer of the colored contact lens to avoid the falling off of the colored layer, at least one of the thickener used in the transparent protective layer and the color layer is a modified polyvinylpyrrolidone. In addition, the modified polyvinylpyrrolidone used in the present invention not only increases the adhesion between the transparent protective layer and the colored layer, but also raises the water content of the colored contact lens at the same time.

In a preferred embodiment of the present disclosure, the first thickener in the transparent protective layer of the colored contact lens is a modified polyvinylpyrrolidone. The first thickener is present at an amount of 25 weight percent to 55 weight percent based on the total weight of the transparent protective layer, preferably at an amount of 35 weight percent to 45 weight percent based on the total weight of the transparent protective layer. In the embodiment of the present disclosure, the modified polyvinylpyrrolidone is produced by a polymerization of N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, the modified polyvinylpyrrolidone is produced by a polymerization of N-vinylacetamide, N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, the second thickener in the colored layer of the colored contact lens is a modified polyvinylpyrrolidone. The second thickener is present at an amount of 9 weight percent to 25 weight percent based on the total weight of the colored layer, preferably at an amount of 10 weight percent to 20 weight percent based on the total weight of the colored layer. In the embodiment of the disclosure, the modified polyvinylpyrrolidone is produced by a polymerization of N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, the second thickener in the colored layer of the colored contact lens is a modified polyvinylpyrrolidone. The modified polyvinylpyrrolidone is produced by a polymerization of N-vinylacetamide, N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, both of the first thickener in the transparent protective layer and the second thickener in the colored layer of the colored contact lens are modified polyvinylpyrrolidone. These thickeners are present at an amount of 34 weight percent to 80 weight percent based on the total weight of the transparent protective layer and the colored layer, preferably at an amount of 45 weight percent to 65 weight percent based on the total weight of the transparent protective layer and the colored layer. In the embodiment, both of the thickeners are produced by polymerization of N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, both of the thickeners are produced by a polymerization of N-vinylacetamide, N-vinylpyrrolidone and 2-hydroxyethyl methacrylate. The resulting polymer further reacted with 2-isocyanatoethyl (meth)acrylate to obtain the modified polyvinylpyrrolidone.

In another preferred embodiment of the present disclosure, one of the first thickener in the transparent protective layer and second thickener in the colored layer is produced by a polymerization of N-vinylpyrrolidone and 2-hydroxyethyl methacrylate. The resulting polymer further reacted with 2-isocyanatoethyl (meth)acrylate to obtain the modified polyvinylpyrrolidone. The other thickener is produced by a polymerization of N-vinylacetamide, N-vinylpyrrolidone and 2-hydroxyethyl methacrylate. The resulting polymer further reacted with 2-isocyanatoethyl (meth)acrylate to obtain the modified polyvinylpyrrolidone.

The addition of the thickener to the transparent protective layer and/or to the colored layer is able to prevent the falling off of the colored layer. Even the addition of the thickener at the lower limit as recommended, the fading or discoloration of the colored contact lenses is still not occurred. If the thickener added an amount exceeded the upper limit as recommended, the coloration can still obtain a better result but the manufacture will be costly.

Moreover, for obtaining better printing performance, the weight average molecular weight of the thickener is in the range of 2,500 to 20,000.

In a preferred embodiment of the present disclosure, the first hydrophilic monomer for forming the transparent protective layer of the colored contact lens and the second hydrophilic monomer for forming the colored layer are respectively selected from the group consisting of N-vinylpyrrolidone (NVP), 2-hydroxyethyl methacrylate (HEMA), lauryl methacryate (LMA), N,N-dimethylacrylamide (DMA), methyl acrylic acid (MAA), N,N-diethylacrylamide, N-isopropylacrylamide, acrylic acid (AA), glycidyl methacrylate (GMA), (methyl)acrylamide, N,N-dimethylaminoethyl methacrylate (DMAEMA), vinyl acetate and N-acrylolmorpholine.

In a preferred embodiment of the present disclosure, the adhesive resin in the colored layer of the colored contact lens is selected from the group consisting of polyurethane, acrylic resin and phenolic resin. In order to make the colored layer have appropriate viscosity, the amount of the adhesive resin used in the colored layer is present at an amount of 5 weight percent to 25 weight percent based on the total weight of the colored layer.

In another preferred embodiment of the present disclosure, the adhesive resin in the colored layer of the colored contact lens is polyurethane, and the viscosity thereof at 25° C. is preferably in the range of 50,000 cps to 150,000 cps, more preferably in the range of 80,000 cps to 110,000 cps.

In an embodiment of the present disclosure, the colorant is present at an amount of 10 weight percent to 60 weight percent based on the total weight of the colored layer for the colored performance and light transmittance of the colored contact lens.

The colorant can be the one commonly used in the related art, for example, organic colorant or inorganic colorant. The organic colorant can be, but not limited to, C.I. Reactive Yellow 14, C.I. Reactive Orange 7, C.I. Reactive Red 23, C.I. Reactive Blue 19. The inorganic colorant can be, but not limited to, iron oxide black, iron oxide brown, iron oxide yellow, iron oxide red or titanium dioxide.

In an embodiment of the present disclosure, the transparent protective layer and the colored layer of the colored contact lens further includes an initiator, a cross-linking agent, a defoaming agent, a dispersant, a anti-blue ray reagent, a UV reagent or the combination thereof.

The initiator could be a photo initiator or a thermal initiator. The suitable thermal initiator can be but not limited to, for example, azobisisoheptonitrile, 2,2'-azobis(isobutyronitrile) (AIBN), 2,2'-azobis(2,4-dimethylvaleronitrile), 2,2'-azobis(2-methyl-propanenitrile), 2,2'-azobis(2-methyl-butanenitrile). The suitable photoinitiator can be not limited to, for example, 2,4,6-trimethylbenzoyl diphenyl oxide, 2-Hydroxy-2-methylpropiophenone, 2,2-Diethoxyacetophenone or ethyl(2,4,6-trimethylbenzoly)phenylphosphinate. Further, the photo initiator or a thermal initiator is present at the amount of 1 weight percent to 5 weight percent based on the total weight of the transparent protective layer or the colored layer of the colored contact lens.

The cross-linking agent is ethylene glycol dimethacrylate (EGDMA), tetraethylene ethylene glycol dimethacrylate (TrEGDMA), triethylene ethylene glycol dimethacrylate (TEGDMA), Poly(ethylene glycol) dimethacrylate, trimethylolpropane trimethacrylate (TMPTA), vinyl methacrylate, ethylenediamine dimethyl acrylamide, glycerol dimethacrylate, triallyisocyanurate, triallyl cyanurate or a combination thereof, for example. Further, the cross-linking agent is present at an amount of 1 to 3 weight percent based on the total weight of the transparent protective layer or the colored layer of the colored contact lens.

For example, the defoaming agent is a hydrophobic polysiloxane material, which is present at an amount of 0.5 to 3 weight percent based on the total weight of the transparent protective layer or the colored layer of the colored contact lens.

In an embodiment of the present disclosure, the lens layer of the colored contact lens is formed by a hydrogel or a silicone hydrogel. The hydrogel can be but not limited to hydrophilic monomers, cross-linking agent and an initiator. The silicone hydrogel can be but not limited to polysiloxane macromers, hydrophilic monomers, cross-linking agent and an initiator.

To simplify the description, the hydrophilic monomer, cross-linking agent and initiators mentioned above will not be described in detail herein.

Moreover, the present disclosure also provides a composition for forming colored contact lenses, including at least one hydrophilic monomer and a thickener, wherein the thickener of the present composition for colored contact lens is a modified polyvinylpyrrolidone which is produced by a polymerization of polymeric monomers and 2-isocyanatoethyl (meth)acrylate, wherein the polymeric monomer is selected from the group consisting of N-vinylpyrrolidone, 2-hydroxyethyl methacrylate and N-vinylacetamide.

In an embodiment of the present disclosure, the composition for colored contact lenses is used to form a transparent protective layer of the colored contact lens.

In an embodiment of the present disclosure, the composition for forming colored contact lenses further includes an adhesive resin and a colorant. In the embodiment of the present disclosure, the composition for forming contact lenses is used to form a colored layer of the colored contact lens.

To simplify the description, the adhesive resin and colorant mentioned above will not be described in detail herein.

The present disclosure will be explained in further detail with reference to the examples. However, the present disclosure is not limited to these examples.

Example A

The Preparation Method of Thickener (I)

0.5 g (3.8 mmole) of 2-hydroxyethyl methacrylate, 30 g (268.23 mmole) of N-vinylpyrrolidone, 0.1 g (0.6 mmole) of 2,2'-azobis(isobutyronitrile) and 69.4 ml of tetrahydrofuran were mixed uniformly in a flask to form a mixture under the nitrogen condition. Then the mixture was heated to 80° C. for 6 hours, after that, the temperature of the mixture was lowered to room temperature. Next, 0.2 mg of 4-Hydroxy-TEMPO (trade name is TEMPOL and available from Sigma-Aldrich, US) was added into the flask and stirred for 30 minutes. Then 0.05 g (0.322 mmole) of 2-isocyanatoethyl methacrylate (trade name is IEM and available from Sigma-Aldrich, US) and 2 drops of dibutyltin dilaurate were added into the flask and stirred for 5 hours. Finally, the solvent was evaporated and the resulting reaction product was obtained. The number average molecular weight of the thickener (I) is 3,984, and the weight average molecular weight thereof is 6,153.

Example B

The Preparation Method of Thickener (II)

0.5 g (3.8 mmole) of 2-hydroxyethyl methacrylate, 30 g (268.23 mmole) of N-vinylpyrrolidone, 0.1 g (0.6 mmole) of 2,2'-azobis(isobutyronitrile) and 69.4 ml of tetrahydrofuran were mixed uniformly in a flask to form a mixture under the nitrogen condition. Then the mixture was heated to 80° C. for 6 hours, after that, the temperature of the mixture was lowered to room temperature. Next, 0.2 mg of 4-Hydroxy-TEMPO (trade name is TEMPOL and available from Sigma-Aldrich, US) was added into the flask and stirred for 30 minutes. Then 0.1 g (0.644 mmole) of 2-isocyanatoethyl methacrylate (trade name is IEM and available from Sigma-Aldrich, US) and 2 drops of dibutyltin dilaurate were added into the flask and stirred for 5 hours. Finally, the solvent was evaporated and the resulting reaction product was obtained. The number average molecular weight of the thickener (II) is 2,870, and the weight average molecular weight thereof is 3,987.

Example C

The Preparation Method of Thickener (III)

0.5 g (3.8 mmole) of 2-hydroxyethyl methacrylate, 30 g (268.23 mmole) of N-vinylpyrrolidone, 5 g (58.75 mmole)

of N-vinylacetamide, 0.15 g (0.913 mmole) of 2,2'-azobis(isobutyronitrile) and 64.35 ml of tetrahydrofuran were mixed uniformly in a flask to form a mixture under the nitrogen condition. Then the mixture was heated to 80° C. for 6 hours, after that, the temperature of the mixture was lowered to room temperature. Next 0.2 mg of 4-Hydroxy-TEMPO (trade name is TEMPOL and available from Sigma-Aldrich, US) was added into the flask and stirred for 30 minutes. Then 0.05 g (0.362 mmole) of 2-isocyanatoethyl methacrylate (trade name is IEM and available from Sigma-Aldrich, US) and 2 drops of dibutyltin dilaurate were added into the flask and stirred for 5 hours. Finally, the solvent was evaporated and the resulting reaction product was obtained. The number average molecular weight of the thickener (III) is 3,945, and the weight average molecular weight thereof is 5,815.

Example D

The Preparation Method of Thickener (IV)

0.5 g (3.8 mmole) of 2-hydroxyethyl methacrylate, 30 g (268.23 mmole) of N-vinylpyrrolidone, 10 g (117.5 mmole) of N-vinylacetamide, 0.15 g (0.913 mmole) of 2,2'-azobis(isobutyronitrile) and 59.35 ml of tetrahydrofuran were mixed uniformly in a flask to form a mixture under the nitrogen condition. Then the mixture was heated to 80° C. for 6 hours, after that, the temperature of the mixture was lowered to room temperature. Next 0.2 mg of 4-Hydroxy-TEMPO (trade name is TEMPOL and available from Sigma-Aldrich, US) was added into the flask and stirred for 30 minutes. Then 0.1 g (0.644 mmole) of 2-isocyanatoethyl methacrylate (trade name is IEM and available from Sigma-Aldrich, US) and 2 drops of dibutyltin dilaurate were added into the flask and stirred for 5 hours. Finally, the solvent was evaporated and the resulting reaction product was obtained. The number average molecular weight of the thickener (IV) is 4,105, and the weight average molecular weight thereof is 6,254.

Example E

The Preparation Method of Thickener (V)

0.5 g (3.8 mmole) of 2-hydroxyethyl methacrylate, 20 g (178.82 mmole) of N-vinylpyrrolidone, 0.1 g (0.6 mmole) of 2,2'-azobis(isobutyronitrile) and 79.4 ml of tetrahydrofuran were mixed uniformly in a flask to form a mixture under the nitrogen condition. Then the mixture was heated to 80° C. for 12 hours, after that, the temperature of the mixture was lowered to room temperature. Next, 0.2 mg of 4-Hydroxy-TEMPO (trade name is TEMPOL and available from Sigma-Aldrich, US) was added into the flask and stirred for 30 minutes. Then 0.25 g (1.61 mmole) of 2-isocyanatoethyl methacrylate (trade name is IEM and available from Sigma-Aldrich, US) and 2 drops of dibutyltin dilaurate were added into the flask and stirred for 5 hours. Finally, the solvent was evaporated and the resulting reaction product was obtained. The number average molecular weight of the thickener (V) is 19,759, and the weight average molecular weight thereof is 20,878.

Example 1

The Preparation Method of Colored Contact Lenses

First, 2-hydroxyethyl methacrylate (HEMA), lauryl methacrylate (LMA), methacrylic acid (MAA), N,N-dimethylacrylamide (DMA), polyurethane (trade name is AgiSyn 230SM-Z90, and is available from Dsm-AGI Corp., Taiwan), polyvinylpyrrodine (trade name is PVP-k30, the weight average molecular weight is 40,000 and is available from Sigma-Aldrich, US), trimethylolpropane triacrylate (trade name is TMPTA and is available from Sigma-Aldrich, US), dispersant (trade name is Disponer 910 and is available from Elementis Specialties, UK), a photoinitiator, 2-hydroxy-2-methylpropiophenone (trade name is UV-1173 and is available from BASF, Taiwan), a defoaming agent (trade name is Defom 6800 and is available from Elementis Specialties, US) and Iron Oxide Black powder (trade name is Sicovi and is available from BASF, Germany) were grinded by a ball mill (RETSCHPM 400) to form a material for forming a colored layer of the colored contact lens. The detailed composition was listed in Table 1 as below.

Then, 2-hydroxyethyl methacrylate (HEMA), methacrylic acid (MAA), polyurethane (trade name is AgiSyn 230SM-Z90, and is available from Dsm-AGI Corp., Taiwan), thickener(I), trimethylolpropane triacrylate (trade name is TMPTA and is available from Sigma-Aldrich, US), a photo initiator, 2-hydroxy-2-methylpropiophenone (trade name is UV-1173 and is available from BASF, Taiwan), a defoaming agent (trade name is Defom 6800 and is available from Elementis Specialties, US) were grinded by a ball mill (RETSCHPM 400) to form a material for forming a transparent protective layer of the colored contact lens. The detailed composition was listed in Table 1 as below.

The material for forming a transparent protective layer was injected into a mold of a contact lens made of polypropylene (PP) and conducted a UV irradiating treatment or a thermal irradiating treatment to form a transparent protective layer. Next, the material for forming a colored layer was added on the transparent protective layer formed on the mold and conducted a UV irradiating treatment or a thermal irradiating treatment to form a colored layer.

After the polymerization was completed, a siloxane macromer (1) (disclosed in TW. Patent No. 1459071, synthesis of siloxane macromer A), a siloxane macromer (11) (disclosed in TW. Patent No. 1459071, synthesis of siloxane macromer B), 2-hydroxyethyl methacrylate (HEMA), N-vinylpyrrodine (NVP), cross-linking agent, photo initiator, 2-hydroxy-2-methylpropiophenone (trade name is UV-1173 and is available from BASF, Taiwan) were mixed at amounts shown in Table 2 to form a material for a lens layer of the colored contact lenses. Then, the material was added by drops on the colored layer formed on the mold of the contact lens and was cured at 80° C. for 5 hrs, then 115° C. for 2 hrs. After the polymerization was completed, the mold was immersed in alcohol for 1 hour and the resulting molded lens was taken out of the mold. In Final, the resulting lens was conducted a hydration treatment and a sterilizing treatment to obtain the colored contact lens. The detailed composition of material for forming a lens layer is listed in Table 2. The steps and the conditions of the hydration treatment and the sterilizing treatment were as follows:

The steps of hydration treatment of the contact lenses:

(a) The mold was immersed in 80% alcohol solution for 1 hour then the resulting molded lens was taken out of the mold.

(b) The polymer resulting molded lens was then immersed in 90% alcohol solution for 1 hour.

(c) The alcohol-immersed contact lens was immersed in heated water at 80° C. for 1 hour.

(d) The contact lens was immersed in a buffer solution to obtain equilibrium for 12 hours.

The Conditions of Sterilizing Treatment:

The conditions of sterilizing treatment: 121° C. for 30 minutes.

Example 2

The Preparation Method of Colored Contact Lenses

The preparation method of Example 2 was same as Example 1, except for the thickener. The thickener (III) was used in the transparent protective layer in Example 2. The detailed composition of Example 2 was listed in Table 1.

Example 3

The Preparation Method of Colored Contact Lenses

The preparation method of Example 3 was same as Example 1, except for the thickener. The thickener (I) was used in the transparent protective layer and polyvinylpyrrodine (PVP) was used as thickener in the transparent protective layer in Example 3. The detailed composition of Example 3 was listed in Table 1.

Example 4

The Preparation Method of Colored Contact Lenses

The preparation method of Example 4 was same as Example 1, except for the thickener. The thickener (III) was used in the colored layer and PVP was used as thickener in the transparent protective layer in Example 4. The detailed composition of Example 4 was listed in Table 1.

Example 5

The Preparation Method of Colored Contact Lenses

The preparation method of Example 5 was same as Example 1, except for the thickener. The thickener (II) was used in both the colored layer and the transparent protective layer at the same time in Example 5. The detailed composition of Example 5 was listed in Table 1.

Example 6

The Preparation Method of Colored Contact Lenses

The preparation method of Example 6 was same as Example 1, except for the thickener. The thickener (IV) was used in both the colored layer and the transparent protective layer at the same time in Example 6. The detailed composition of Example 6 was listed in Table 1.

Example 7

The Preparation Method of Colored Contact Lenses

The preparation method of Example 7 was same as Example 1, except for the thickener. The thickener (V) was used in the transparent protective layer in Example 7. During forming process in Example 7, the viscosity of material for forming transparent protective layer is too high such that the material for forming transparent protective layer is incapable of being printed completely on the mold of a contact lens made of polypropylene (PP). Therefore, the thickener (V) can not be used to prepare the colored contact lens.

Comparative Example 1

The Preparation Method of Colored Contact Lenses

The preparation method of Comparative Example 1 was same as Example 1, except for the thickener. The thickeners were used in the colored layer and the transparent protective layer are both PVP in Comparative Example 1. The detailed composition of Comparative Example 1 was listed in Table 1.

The physical properties of the colored contact lenses prepared from Example 1 to Example 6 and Comparative 1 were measured according to the following measuring method. The resulting data were listed in the Table 3.

(a) Measurement of the Water Content of Contact Lenses

The contact lens was immersed in the phosphate buffered saline (PBS) for 24 hours. Then, the contact lens was removed therefrom and was taken to remove all surface water. After that, the weight of contact lens was measured. Next, the contact lens was dried at 600 W for 5 minutes by microwave and after that the weight of hydrated contact lens was measured.

The water contact of contact lenses was calculated by the following equation:

(the weight of hydrated contact lenses−the weight of dried contact lenses)/the weight of hydrated contact lenses×100%.

(b) Measurement of Tensile Modulus, Tensile Strength and Elongation Ratio of Contact Lenses The test sample was cut from the middle area of a contact lens into a sample size of 10 mm. Then, the test sample was immersed in a buffer specified in ISO 18369-3 Section 4.7 for 2 hours. After that, the test sample was taken to remove all surface water and be conducted to proceed tensile modulus and tensile strength measurement by using a test instrument, AI-3000 (available from Gotech Testing Maching Inc.) in a condition of temperature between 20±5° C. and a humidity between 55%±10%. The measurement was carried out at a constant loading speed of 10 mm/min. In final, the tensile modulus, tensile strength and elongation ratio were determined according to the initial gradient of the strain-stress curve. The unit of the tensile modulus is defined as MPa, the unit of tensile strength is defined as gram and the unit of the elongation ratio is weight percent.

(c) Measurement of Oxygen Permeability of Contact Lenses

The oxygen permeability (Dk) was measured according to ISO standards 18369-4:2006, 4.4.3, by using a oxygen permeability tester (201T). The units of oxygen permeability (Dk) is defined as $10^{-10}$ $(mlO_2 mm)/(cm^2$ sec mm Hg).

(d) Evaluation of Deformation of Contact Lenses

The appearance of the contact lens was observed visually to judge whether the deformation occurred or not.

(e) Evaluation of Discoloration of Contact Lenses

The contact lens was put on a stage and a cotton swab was used to rub the surface of the contact lens for 40 times. In final, the surface of the cotton swab was observed visually to judge whether any color fading from the contact lenses.

While the disclosure has been described by way of example(s) and in terms of the embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

TABLE 1

The detailed composition of Example 1 to Example 6 and Comparative Example 1

| Composition | | Example 1 | | Example 2 | | Example 3 | | Example 4 | |
|---|---|---|---|---|---|---|---|---|---|
| | | Colored layer (wt %) | Transparent protective layer (wt %) | Colored layer (wt %) | Transparent protective layer (wt %) | Colored layer (wt %) | Transparent protective layer (wt %) | Colored layer (wt %) | Transparent protective layer (wt %) |
| Hydrophilic monomers | HEMA | 27.27 | 56.95 | 27.27 | 56.95 | 27.27 | 56.95 | 27.27 | 56.95 |
| | LMA | 1.19 | | 1.19 | | 1.19 | | 1.19 | |
| | DMA | 1.2 | | 1.2 | | 1.2 | | 1.2 | |
| | MAA | 1.58 | 2.12 | 1.58 | 2.12 | 1.58 | 2.12 | 1.58 | 2.12 |
| Adhesive resin | Polyurethane | 11.09 | | 11.09 | | 11.09 | | 11.09 | |
| Thickener | PVP | 14.69 | | 14.69 | | | 36.17 | | 36.17 |
| | Thickener (I) | | 36.17 | | | 14.69 | | | |
| | Thickener (II) | | | | | | | | |
| | Thickener (III) | | | | 44.64 | | | 14.69 | |
| | Thickener (IV) | | | | | | | | |
| Cross-linking agent | TMPTA | 1.57 | 1.5 | 1.57 | 1.5 | 1.57 | 1.5 | 1.57 | 1.5 |
| Photo initiator | UV1173 | 1.97 | 2.26 | 1.97 | 2.26 | 1.97 | 2.26 | 1.97 | 2.26 |
| Defoaming agent | Deform 6800 | 1.5 | 1 | 1.5 | 1 | 1.5 | 1 | 1.5 | 1 |
| Colorant | Sicovi | 37.94 | | 37.94 | | 37.94 | | 37.94 | |

| Composition | | Example 5 | | Example 6 | | Comparative Example 1 | |
|---|---|---|---|---|---|---|---|
| | | Colored layer (wt %) | Transparent protective layer (wt %) | Colored layer (wt %) | Transparent protective layer (wt %) | Colored layer (wt %) | Transparent protective layer (wt %) |
| Hydrophilic monomers | HEMA | 27.27 | 56.95 | 27.27 | 56.95 | 27.27 | 56.95 |
| | LMA | 1.19 | | 1.19 | | 1.19 | |
| | DMA | 1.2 | | 1.2 | | 1.2 | |
| | MAA | 1.58 | 2.12 | 1.58 | 2.12 | 1.58 | 2.12 |
| Adhesive resin | Polyurethane | 11.09 | | 11.09 | | 11.09 | |
| Thickener | PVP | | | | | 14.69 | 36.17 |
| | Thickener (I) | | | | | | |
| | Thickener (II) | 14.69 | 36.17 | | | | |
| | Thickener (III) | | | | | | |
| | Thickener (IV) | | | 14.69 | 44.64 | | |
| Cross-linking agent | TMPTA | 1.57 | 1.5 | 1.57 | 1.5 | 1.57 | 1.5 |
| Photo initiator | UV1173 | 1.97 | 2.26 | 1.97 | 2.26 | 1.97 | 2.26 |
| Defoaming agent | Deform 6800 | 1.5 | 1 | 1.5 | 1 | 1.5 | 1 |
| Colorant | Sicovi | 37.94 | | 37.94 | | 37.94 | |

From the results shown in Table 3, it can be seen that the discoloration of the colored contact lens prepared according to the Comparative Example 1 which used PVP as thickener occurred. However, in the Example 1 to Example 6, no discoloration occurred because there is at least one modified polyvinylpyrrolidone as a thickener used in the transparent protective layer and the colored layer. Furthermore, the colored contact lens of Example 1 to Example 6 also has no deformation occurrence.

In addition, the water content of the colored contact lenses prepared according to Example 1 to Example 6 is 46% to 47.2%, the tensile modulus thereof is about 0.6 MPa to 0.68 MPa, the tensile strength thereof is about 29 g to 40 g and the elongation ratio is about 68% to 83%. Besides, the oxygen permeability thereof is about 118 to 122.

TABLE 2

The detailed composition for forming lens layer of colored contact lenses

| | Composition | (wt %) |
|---|---|---|
| Siloxane macromer | Siloxane macromer (I) | 41.8 |
| | Siloxane macromer (II) | 6.3 |
| Hydrophilic monomer | NVP | 43.9 |
| | 2-HEMA | 6.3 |
| Cross-linking agent | EGDMA | 1 |
| Initiator | AIBN | 0.7 |
| Solvent | Hexanol | 25.1 |

TABLE 3

The measurement results of Example 1 to Example 6 and Comparative Example 1

| Test item | Example | | | | | | Comparative Example 1 |
| --- | --- | --- | --- | --- | --- | --- | --- |
| | 1 | 2 | 3 | 4 | 5 | 6 | 1 |
| Tensile modulus (MPa) | 0.63 | 0.68 | 0.62 | 0.65 | 0.61 | 0.60 | 0.67 |
| Tensile Strength (g) | 40 | 38 | 30 | 31 | 30 | 29 | 34 |
| Elongation ratio (%) | 68 | 70 | 78 | 77 | 80 | 83 | 74 |
| Water content (%) | 47.0 | 47.2 | 47.2 | 46.8 | 46.9 | 46.0 | 46.6 |
| Oxygen permeability (Dk) | 121 | 120 | 119 | 121 | 118 | 122 | 120 |
| Deformation | No | No | No | No | No | No | No |
| Discoloration | No | No | No | No | No | No | Yes |

What is claimed is:

1. A colored contact lens, comprising:
a transparent protective layer which is produced by a polymerization of at least one first hydrophilic monomer and a first thickener;
a colored layer which is produced by a polymerization of at least one second hydrophilic monomer, an adhesive resin, and a second thickener, and a colorant; and
a lens layer which is formed by a hydrogel or a silicone hydrogel,
wherein the colored layer is between the transparent protective layer and the lens layer and at least one of the first thickener and the second thickener agent is a modified polyvinylpyrrolidone which is produced by a polymerization of polymeric monomers and 2-isocyanatoethyl (meth)acrylate, wherein the polymeric monomer is selected from the group consisting of N-vinylpyrrolidone, 2-hydroxyethyl methacrylate and N-vinylacetamide.

2. The colored contact lenses according to claim 1, wherein the first hydrophilic monomer and the second hydrophilic monomer is respectively selected from the group consisting of N-vinylpyrrolidone (NVP), 2-hydroxyethyl methacrylate (HEMA), lauryl methacryate (LMA), N,N-dimethylacrylamide (DMA), methyl acrylic acid (MAA), N,N-diethylacrylamide, N-isopropylacrylamide, acrylic acid (AA), glycidyl methacrylate (GMA), (methyl) acrylamide, N,N-dimethylaminoethyl methacrylate (DMAEMA), vinyl acetate and N-acrylolmorpholine.

3. The colored contact lenses according to claim 1, wherein the first thickener is a modified polyvinylpyrrolidone.

4. The colored contact lenses according to claim 3, wherein the first thickener is present at an amount of 25 weight percent to 55 weight percent based on the total weight of the transparent protective layer.

5. The colored contact lenses according to claim 1, wherein the second thickener is a modified polyvinylpyrrolidone.

6. The colored contact lenses according to claim 5, wherein the second thickener is present at an amount of 9 weight percent to 25 weight percent based on the total weight of the colored layer.

7. The colored contact lenses according to claim 1, wherein both the first thickener and the second thickener are modified polyvinylpyrrolidone.

8. The colored contact lenses according to claim 7, wherein the first thickener and the second thickener are present at an amount of 34 weight percent to 80 weight percent based on the total weight of the transparent protective layer and the color layer.

9. The colored contact lenses according to claim 1, wherein the adhesive resin is selected from the group consisting of polyurethane, acrylic resin, and phenolic resin.

10. The colored contact lenses according to claim 1, further comprising an initiator, a cross-linking agent, a defoaming agent, a dispersant, an anti-blue ray reagent, an UV blocking reagent or a combination thereof.

* * * * *